United States Patent [19]
Castillo

[11] Patent Number: 6,101,366
[45] Date of Patent: Aug. 8, 2000

[54] SOUND BELT FOR DIAPERS

[76] Inventor: Celia Castillo, 2285 SW. 6 Ct., Hialeah, Fla. 33010

[21] Appl. No.: 09/336,043

[22] Filed: Jun. 18, 1999

[51] Int. Cl.[7] ....................................................... G09B 5/00
[52] U.S. Cl. ........................... 434/308; 434/309; 434/320; 40/586; 446/397
[58] Field of Search ..................................... 434/308, 309, 434/318, 320; 40/586; 446/397

[56] References Cited

U.S. PATENT DOCUMENTS

| | | |
|---|---|---|
| 1,716,689 | 6/1929 | Freemark . |
| 2,064,603 | 12/1936 | Harrison . |
| 3,777,310 | 12/1973 | Yang . |
| 4,451,911 | 5/1984 | Klose et al. ............................... 369/31 |
| 4,820,164 | 4/1989 | Kemper ................................... 434/238 |
| 5,027,442 | 7/1991 | Taylor ........................................ 2/338 |
| 5,279,514 | 1/1994 | Lacombe et al. ....................... 446/297 |
| 5,912,653 | 6/1999 | Fitch ........................................ 345/87 |

Primary Examiner—Sam Rimeley
Assistant Examiner—Bena B. Miller
Attorney, Agent, or Firm—J. Sanchelima

[57] ABSTRACT

A sound belt removably mounted on diapers includes a housing with two opposite flat surfaces on which one or more switch actuators are exposed. A removably mounted overlay with pictorial representations that cooperatively coincide with the switches permit a baby to activate them. Prerecorded sounds, including messages, are generated in response to the actuation of the switches and these messages are relevant to the pictorial representations so that the baby user learns what they means and aids him/her in communicating his/her desires and/or needs.

2 Claims, 2 Drawing Sheets

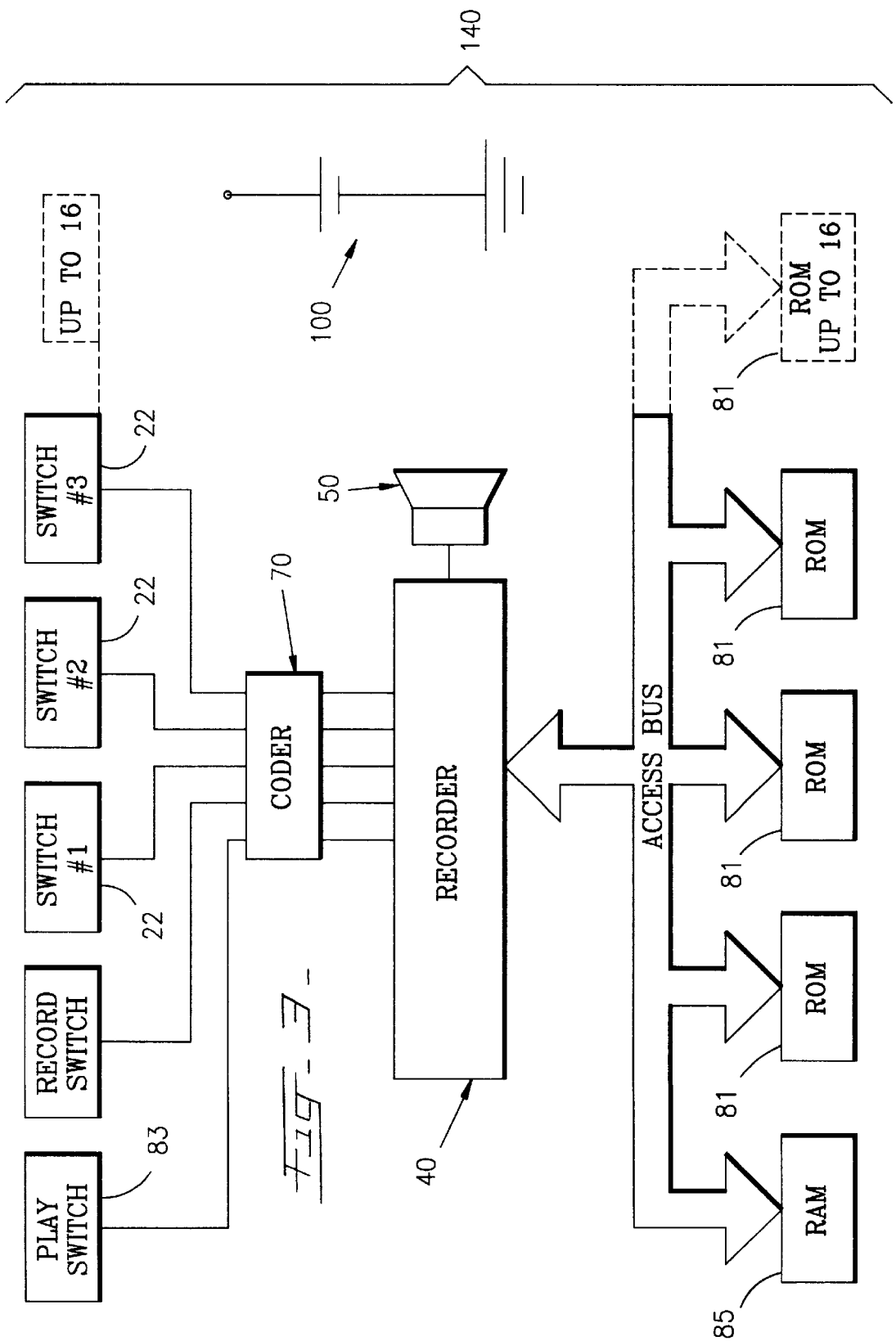

SOUND BELT FOR DIAPERS

II. BACKGROUND OF THE INVENTION

1. Field of the Invention.

The present invention relates to a sound belt for diapers, and more particularly, to a sound belt that contains prerecorded sounds that can be associated with pictorial representations.

2. Description of the Related Art.

Applicant believes that the closest reference corresponds to U.S. Pat. No. 4,820,164 issued to Kemper (1989). However, it differs from the present invention because the patented invention lacks, inter alia, any circuitry or means to generate sounds to reinforce the pictorial representations of the pad.

Other patents describing the closest subject matter provide for a number of more or less complicated features that fail to solve the problem in an efficient and economical way. None of these patents suggest the novel features of the present invention.

III. SUMMARY OF THE INVENTION

It is one of the main objects of the present invention to provide a sound belt for diapers that can be removably mounted within their reach to help them communicate their desires or preoccupations.

It is another object of this invention to provide a sound belt that can be removably mounted in diapers with removable overlays that can be changed depending on circumstance an user's parents or keepers desires.

It is still another object of the present invention to provide a sound belt that is capable of recording sounds for subsequent play back.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates an electronic diagram for one of the preferred embodiments for the present invention.

V. DETAILED DESCRIPTION OF THE PREFERRED EMBODIMENT

Figure 1:
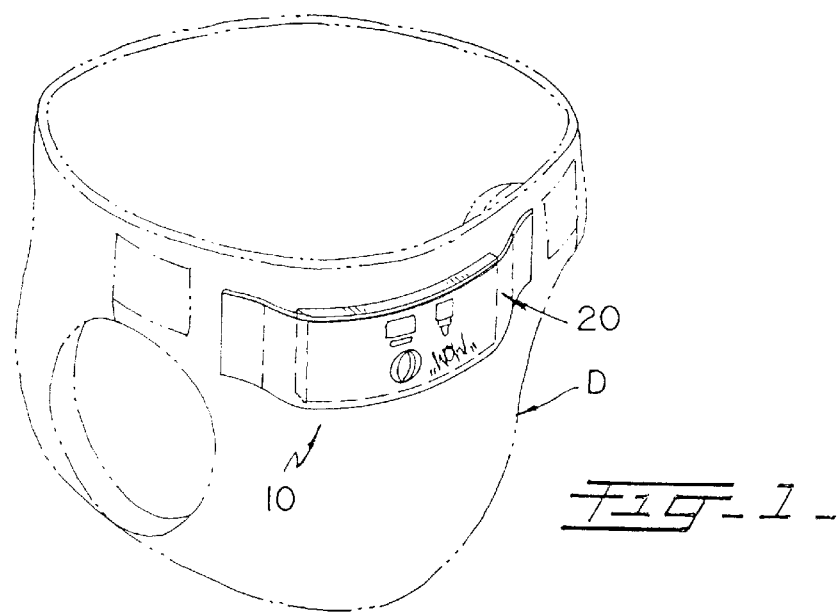
FIG. 1 represents an isometric view of one of the preferred embodiments for the present inventions, placed on a diaper (shown in phantom).
Figure 2:
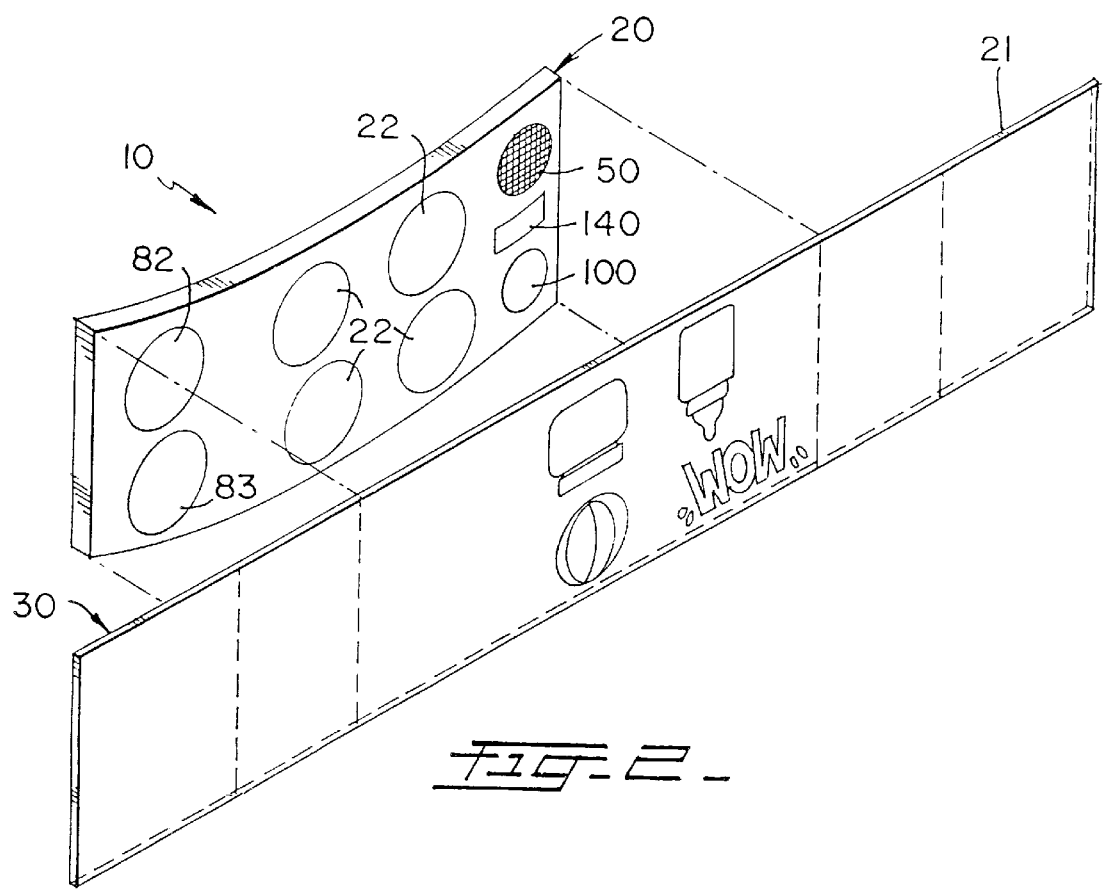
FIG. 2 shows an isometric view of the present invention showing the overlay separated from the housing exposing the switches.

Referring now to the drawings, where the sound belt for diapers is generally referred to with numeral 10, it can be observed that it basically includes a diaper D with elongated and flat housing 20 mounted thereon, preferably in the front belly area. The bottom or inner surface of housing 20 includes suitable pressure sensitive adhesive material 21. An overlay 30 with pictorial representations is designed to coincide with switches 22 on the outer surface of housing 20. Housing 20 contains the electronics for generating predetermined sounds that have, preferably, some relevance to the pictorial representation in overlay 30.

As it can be seen from FIG. 1, overlay 30 is removably mounted to diaper D cooperatively covering switches 22 of housing 20. The pictorial representations are up side down so that the baby can view them and recognize them better. Upon pressing one of the pictorial representations, a predetermined sound is generated by the electronic circuit 140 and speakers/microphone 50, as shown in FIG. 3. Also, a prerecorded message or sound can be erasably stored for subsequent generation upon the activation of a pre-selected switch 22 by exerting pressure on the corresponding pictorial illustration. For instance the mother's voice can be recorded so that the child may hear it when he or she presses a given pictorial (that could be the mother's picture). Hearing a familiar voice may pacify the child or make him feel more at ease. Other pictorials may be used to aid the child in his early communication attempts. For instance, a milk bottle is one of those representations and the sound that it would generate could be "milk" or "food". If the pressing of this button is reinforced with an actual bottle of milk being presented to the child, it will not be long before her or she is trained to ask for things, through the pressing of buttons. The same can be said for toilet training.

As it can be seen from FIG. 3, integrated circuit 140 is a ADPCM solid state recorder IC (it can be implemented with chip MSM 6688, manufactured by Oki Semiconductors, Inc., Tokyo, Japan) with inputs connected to coder 70 and then to switches 22, 82, and 83. Circuit 140 is connected through an access bus to RAM circuit 85 (implemented with Oki Semiconductor's MSM 6685) and up to 16 ROM circuits 81 (implemented with Oki Semiconductor's MSM 6596A) to store erasable data and permanent data, respectively. The data corresponds to sounds recorded through microphone/speaker 50 and stored in circuit 85. Record switch 82 is activated to enable the recording function. Play switch 83 enables the playback function. Battery assembly 100 provides the necessary power for the circuitry. It should be understood that there are many other manners for implementing the invention using other components that will provide similar results within the inventive concept claimed in the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A sound belt configured for attachment to a diaper, comprising:

A) a housing having an upper surface and a lower surface; integrated circuit means located within said housing including a memory, means for recording user defined sounds to said memory and means for playback of said user defined sounds from said memory;

B) switch means located on said upper surface of said housing for actuating said recording or playback of said user defined sounds;

C) a flexible overlay having an upper surface, a lower surface and means for attachment to a diaper on said lower surface;

D) said flexible overlay upper surface further including at least one pictorial representation overlaid upon said switch means;

E) wherein said memory contains audio data of user defined sounds which essentially correspond to said pictorial representations, so that pressing upon said pictorial representation will actuate said switch means and playback said user defined sounds.

2. The sound belt configured for attachment to a diaper set forth in claim 1, further comprising a microphone means for recording said user defined sounds to said memory.

* * * * *